United States Patent [19]
O'Driscoll

[11] Patent Number: 5,927,748
[45] Date of Patent: Jul. 27, 1999

[54] MULTI-STAGE INFLATABLE BAG FOR VEHICULAR SAFETY SYSTEMS

[76] Inventor: Peter O'Driscoll, 1166 Richardson Ave., Los Altos, Calif. 94024

[21] Appl. No.: 08/883,028

[22] Filed: Jun. 26, 1997

[51] Int. Cl.[6] .................................................. B60R 21/24
[52] U.S. Cl. ............................................................ 280/729
[58] Field of Search ............................................. 280/729

[56] References Cited

U.S. PATENT DOCUMENTS

| | | | |
|---|---|---|---|
| 3,614,127 | 10/1971 | Glance | 280/729 |
| 3,990,210 | 11/1976 | Lohr et al. | 280/729 |
| 4,265,468 | 5/1981 | Suszko et al. | 280/729 |
| 5,249,824 | 10/1993 | Swann et al. | 280/729 |
| 5,468,013 | 11/1995 | Gille | 280/729 |

*Primary Examiner*—Kenneth R. Rice
*Attorney, Agent, or Firm*—Roy W. Latham

[57] ABSTRACT

A multi-stage inflatable bag for vehicular airbag safety systems in which multiple stages are used to control its inflation and deflation characteristics. The described multi-stage bag is inflated at a predetermined and controlled rate by port means that exhaust gas from a first inflatable bag into a second inflatable bag.

10 Claims, 6 Drawing Sheets

MULTI-STAGE INFLATABLE BAG FOR VEHICULAR SAFETY SYSTEMS

BACKGROUND OF THE INVENTION

The present invention, generally, relates to airbags and, more particularly, to inflatable airbags for use in vehicles to protect an individual from injury during an accident.

In today's transportation vehicles, particularly automobiles, the use of airbags has become almost second nature with the driving public. Such universal use is due to airbags now being recognized for their injury saving, even life saving, potential.

However, recently an alarming number of injuries have been due to the airbags deploying suddenly and unexpectently, without cause. Usually in such incidents, the force of the deploying airbag itself causes the injury, even death.

Present day airbags have potentially dangerous characteristics during inflation, and during even minor accidents, individuals have been injured, some fatally. It is recognized that some form of control would be preferable, rather than disconnecting the airbags completely.

The principal function of an airbag during an accident is to fill the space between an individual an the interior structure of the vehicle. The airbag is inflated quickly with a selected gas, usually nitrogen but not necessarily, at speeds that are in the order of 200 milliseconds, or as fast as a human eye can blink.

Of course, present day airbags are arranged for a worst case condition. For instance, a 200 mile per hour airbag inflation velocity may be justified for a high speed, 65 mile per hour collision.

For a collision at a lower speed, however, the 200 mile per hour velocity of an inflating airbag is not necessary and can, in fact, cause injury to an occupant. A tailoring of the inflation velocity profile can reduce the risk of such injury to the occupant when the inflating bag strikes the occupant.

The necessary high speed of inflating the airbag also develops a force on impact with an individual, producing an injury. Present-day efforts to avoid this type of injury seem to be directed at developing some control over the rate of inflation for the airbag, but unless the inflation is accomplished quickly, there is a risk that it will be too late to prevent the individual coming into contact with the inside structure of the vehicle.

Previous efforts to avoid injury to individuals from airbags have taken many forms, some include the following.

For example, U.S. Pat. No. 5,564,743 to Marchant describes a housing with two chambers, one having a frangible section to rupture producing different levels of inflation.

U.S. Pat. No. 5,551,723 to Mahon et al. describes a valve arrangement to control the rate of gas flow as a form of airbag inflation control.

U.S. Pat. No. 5,435,594 to Gille describes a system for airbag inflation to protect an out of position occupant by a manifold coupled with two air bags.

U.S. Pat. No. 5,468,013 to Gille describes a manifold for controlling gas inflation between inner and outer airbags at different rates.

U.S. Pat. No. 4,213,635 to Inokuchi et al. describes a device to supply pressure to an airbag and a second device supply delayed pressure.

OBJECTS AND SUMMARY OF THE INVENTION

It is an object of the present invention to provide a new and improved airbag system for avoiding injury during deployment.

Another object of the present invention is to provide an airbag system with an improved optimization of the inflation rate over a wide range of vehicle impact velocities during an accident.

It is an object of the present invention to provide an airbag for vehicular airbag systems that has an optimized inflation rate characteristic that reduces injury potential to individuals.

It is also an object of the present invention to provide a new and improved airbag that simplifies construction.

Briefly, an airbag constructed according to the present invention has multi-stages with an inner, smaller airbag and an outer, larger airbag. The inner airbag is inflated using the full force of the inflator for the initial expansion. The outer airbag is inflated through the inner airbag, and therefore, it is inflated more slowly.

According to the present invention, the airbag is effective regardless of the severity of the accident by bleeding off some of the pressure used in expanding the inner airbag initially and using this pressure in the outer airbag preserving its ability as a cushion during the force of the accident, whether sever or minor.

Therefore, an airbag system constructed and arranged in accordance with the principles of the present invention is provided with a multiple stage inflation structure. Control of the inflation performance characteristics is provided by an arrangement of the size and number of various ports in the system.

The above and other objects and advantages of the present invention will become more readily apparent from the following detailed description of the presently preferred embodiment taken in conjunction with the accompanying drawings.

BRIEF DESCRIPTION OF THE DRAWINGS

In the drawings, the same reference numerals are used to identify the same or similar component parts, in which.

More particularly, this invention relates to an improved airbag design which uses multiple inflation and deflation stages to control potentially dangerous airbag characteristics. Improved control, in turn, improves the overall safety of the airbag as it inflates and deflates during an accident.

DETAILED DESCRIPTION OF THE INVENTION

Figure 6:
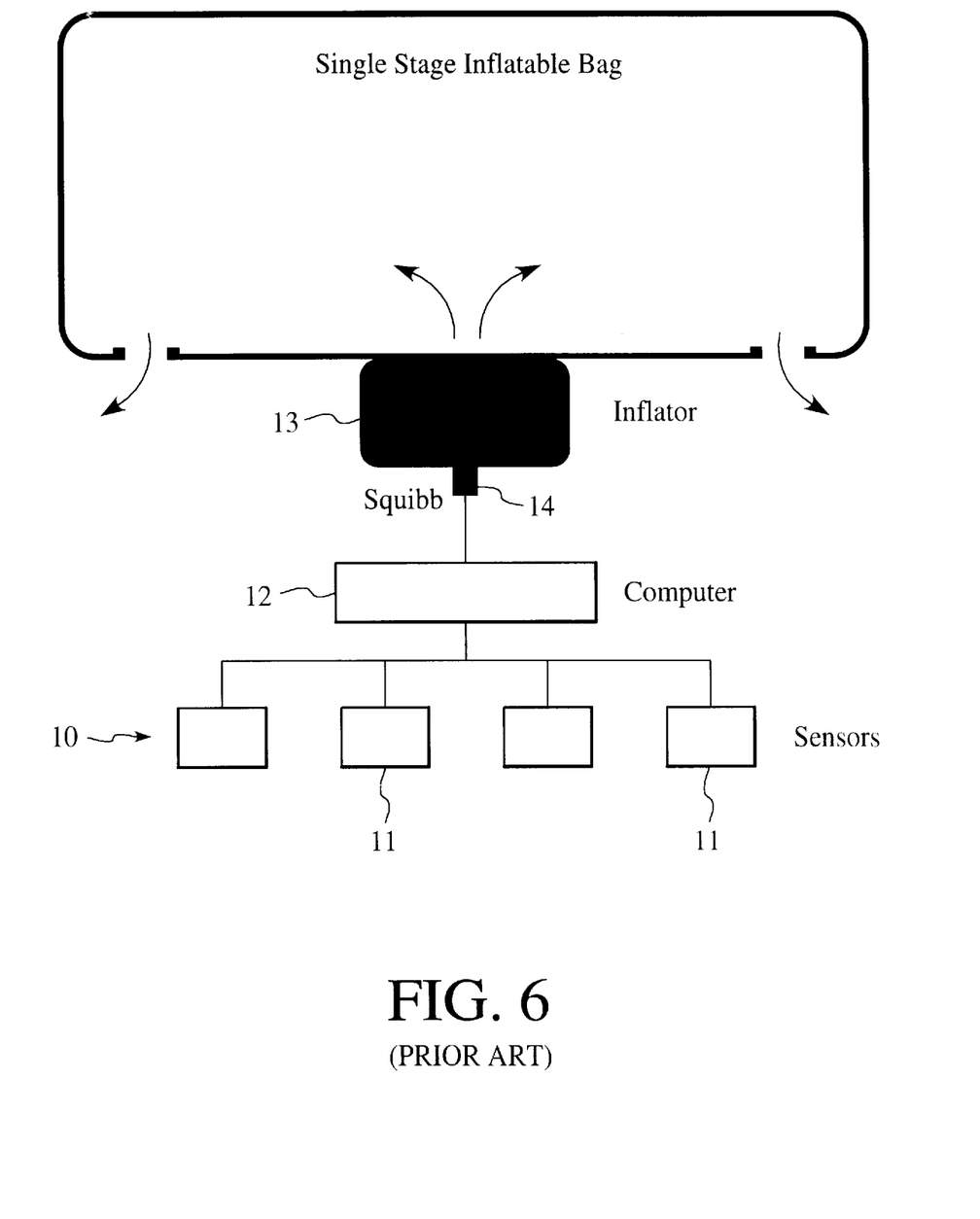
FIG. 6 is an illustration of a single stage inflatable bag as found in the prior art.

Vehicular airbag systems that are available today use three components generally, as illustrated in FIG. 6 of the drawings. A sensor subsystem 10, usually, is formed with several sensors 11 connected with a computer 12 to sense an impact that, potentially, could be harmful.

During any such harmful impact, the sensor subsystem 10 sends a signal to an inflator 13, which can be a small container for storing either pressurized gas or pyrotechnic pellets or powder. A pyrotechnic substance usually is ignited by an electrical element, called a squibb, identified by the numeral 14.

On command, the inflator 13 releases a high-pressure gas into an inflatable bag 15. The inflatable bag fills the space between an occupant of the vehicle and the structure of the vehicle, affording protection for the occupant. The inflatable bag 15 usually is made of woven fabric, but it may also be made of plastic film material.

It should be noted, therefore, that the inflatable bag usually is called an "airbag", even when the bag is inflated by a gas other than air. The present invention concerns a system, including an inflatable airbag, even when the "airbag" of the present invention is inflated by other than air.

Before deployment during an accident, the inflatable bag is folded and stored in a container located between an occupant and the structure of the vehicle. The occupant may be the driver of the vehicle or a passenger.

The container positions the inflatable bag in such a manner that, when deployed during an accident, the occupant strikes the inflatable bag and not the vehicle structure directly. In essence, the inflatable bag provides a cushion which reduces the force of impact between the occupant and the vehicle structure.

Current airbags inflate outward from the container toward the occupant a distance of about 12 inches. The surface of the inflatable bag moves toward the occupant at a very high speed, achieving about 200 miles per hour during inflation.

At 200 miles per hour, the outer surface of the bag traverses the 12 inch inflation distance in about 3.5 milliseconds. With such rapid deployment at such high speeds, the inflatable bag itself can injure the occupant and in some cases cause death. Current airbag inflation and deflation strategies generally are designed for worst-case conditions.

Figure 4A:
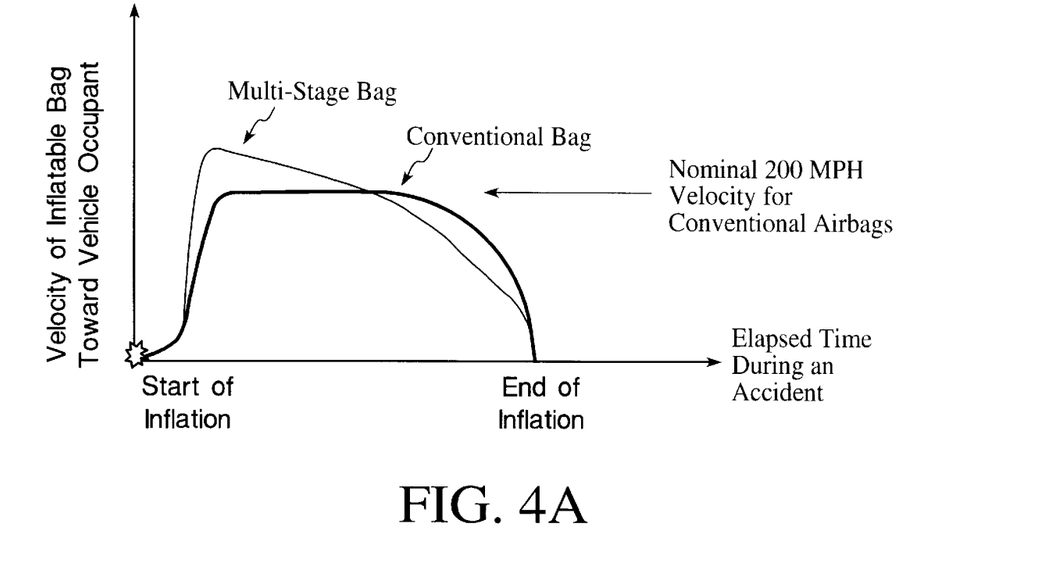
FIG. 4A is a plot of velocity of airbag movement vs. time illustrating airbag movement during inflation.
Figure 4B:
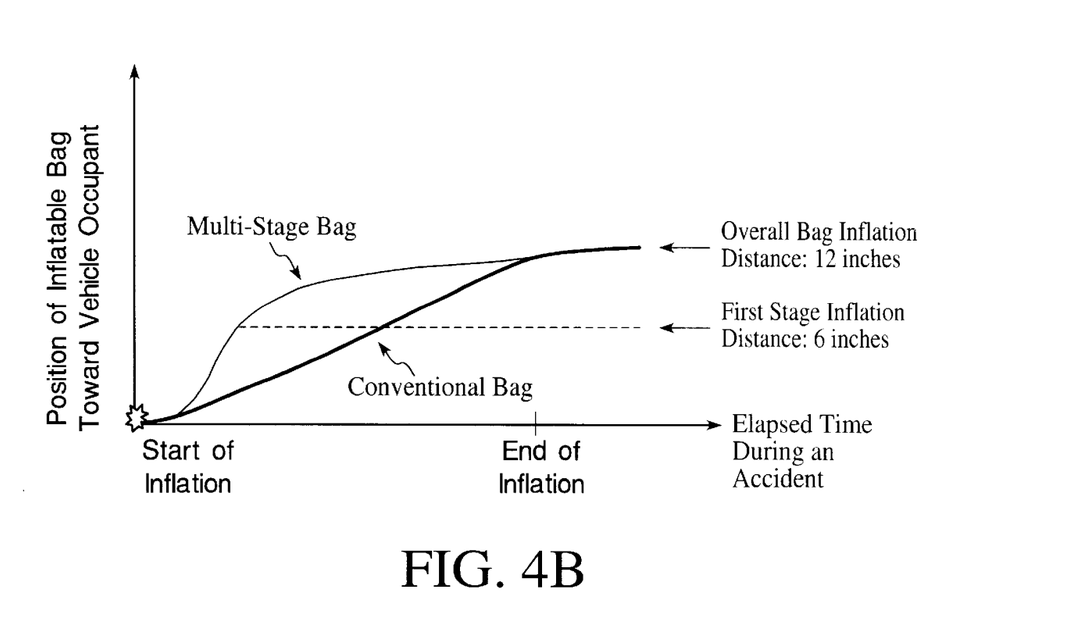
FIG. 4B is a plot of location of an airbag relative to the occupant vs. time during inflation.

This effect can be seen by referring to the velocity profiles illustrated in FIG. 4A and in FIG. 4B of the drawings. In FIG. 4A, for example, a chart plots the outward velocity of the inflatable bag toward the occupant on the Y axis against the time elapsed since the beginning of inflation on the X axis.

In this figure, two inflation velocity profiles are superimposed on each other. The first profile, a heavy line, is typical of current airbag arrangements.

That is, once the inflator receives a start signal from the computer, the velocity of the outer surface of the inflatable bag increases rapidly to about 200 miles per hour. At the end of the inflation period, when the bag is fully inflated, the velocity of the outer surface decreases to zero miles per hour.

FIG. 4B of the drawings illustrates the corresponding position profile for current airbag arrangements. The heavy line indicates that current bags inflate outward to a distance of about 12 inches.

Referring again to FIG. 4A, a lighter line shows the improved velocity control available in a multi-stage airbag design, in accordance with the present invention. In this profile the initial outer surface velocity is higher than the nominal 200 miles per hour figure.

However, as the inflation proceeds, the outer surface velocity decreases in a more controlled manner to zero at the end of the inflation period.

In contrast, as illustrated in FIG. 4B, the first stage of the multi-stage bag inflates rapidly to a distance of about 6 inches and, then, the second stage of the multi-stage bag inflates more slowly to the fully inflated distance of about 12 inches.

For both single-stage and multi-stage profiles, the end result is the same. That is, the bag is fully inflated at the end of the inflation period.

However, the multi-stage inflation velocity profile, arranged according to the present invention, is less dangerous to the occupant, because the occupant is more likely to strike the inflating airbag near the end of the inflation cycle. It is at this point, according to the invention, that the velocity of the outer surface is lower, thus reducing dangerous forces.

Further, due to the explosive nature of the inflation process during an accident, the inflatable bag of prior-art airbag systems must be manufactured from strong, heavy material. The mass of the heavy material, coupled with its potential abrasiveness, moving at very high velocity during inflation, can cause lacerations and other wounds to the occupant.

Once fully inflated, the inflatable bag of the present invention cushions the occupant while gas continues to fill the inflatable bag—a period of about 35 milliseconds. When gas flow stops, the bag deflates. The deflation process limits the forces on the occupant due to deceleration of the vehicle.

Gas is expelled from the inflatable bag through exhaust ports. The amount and rate of gas expelled determines the effects of deflation cushioning on the vehicle occupant.

If the bag deflates too slowly, the occupant may be injured when he or she impacts the inflatable bag. If the bag deflates too rapidly and the cushioning effect is removed prematurely, the occupant may be injured by the vehicle structure.

Figure 1:
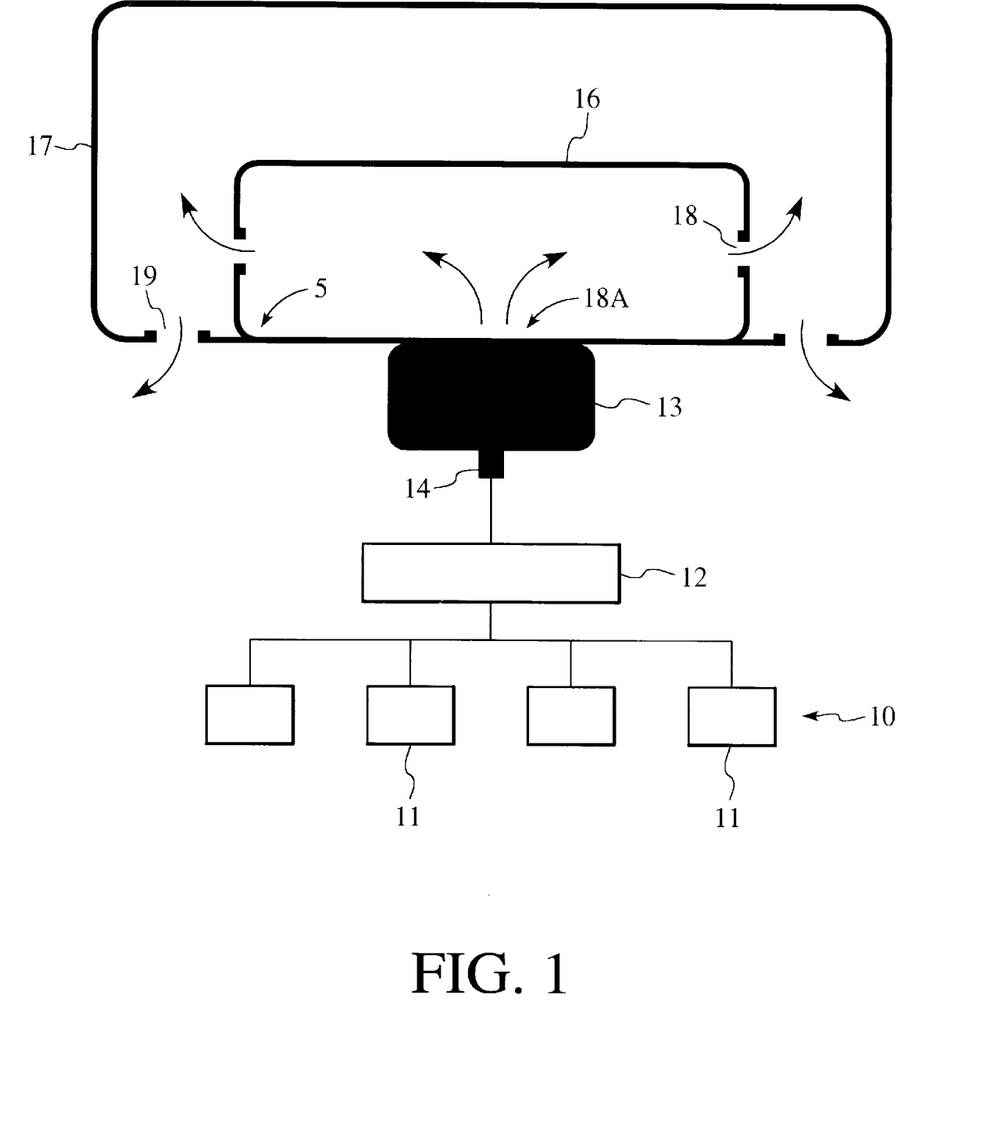
FIG. 1 is an illustration of a multi-stage airbag system with an inflatable bag arrangement in accordance with the invention.

Referring now to FIG. 1 of the drawings, a two-stage inflatable bag according to the present invention is identified generally by the numeral 15 as being formed with a primary bag 16 within a secondary bag 17. The primary bag 16 inflates first at very high velocity. The secondary bag 17 inflates next at lower overall velocity.

The airbag 16 is constructed of strong, heavy material which is required to contain the force produced by the very rapid inflation. Since the secondary bag 17 inflates more slowly, it is constructed of lighter and softer material. Only the lighter and softer secondary bag 17 contacts the vehicle occupant.

High pressure gas from the inflator 13 enters the primary inflatable bag 16 first through ports 16a (not visible) to inflate it rapidly. During and after the inflation of the primary inflatable bag 16, the same gas passes through primary bag ports 18 into the secondary inflatable bag 17.

Preferably, the volume of the secondary bag 17 is greater than than the volume of the primary bag 16. Since the inflation gas loses energy when passing through the primary bag ports 18, the inflation time of the secondary bag 17 is longer than the inflation time of the primary bag 16.

The primary inflatable bag 16 is sealed with the secondary inflatable bag 17 as indicated by the letter S. During and after inflation of the secondary inflatable bag 17, the gas passes through exhaust ports 19 into the atmosphere.

The risk of harm is reduced over existing airbags because the bag inflates in a more controlled manner. The risk of harm is also reduced because parts of the inflatable bag are manufactured from lighter and softer materials.

The airbag 15 of the present invention also reduces the risk of harm by providing more gentle protection for the occupant once contact with the bag is made. The airbag 15 also protects the occupant over a wide range of vehicle impact velocities. This will become clearer from the following description of the operation of an airbag of the present invention.

Again referring to FIG. 1 of the drawings, at the start of an accident and on command from the computer 12 and the acceleration sensors 11, the squibb 14, or the inflator 13, starts the flow of high pressure gas into the primary airbag 16.

During and after inflation of the primary bag 16, gas flows from the primary bag into the secondary bag 17 through ports 18. During and after inflation of the secondary bag 17, gas flows from the secondary bag out into the atmosphere through exhaust ports 19. The occupant of the vehicle contacts the secondary bag 17 only, not the primary bag 16.

Figure 5:
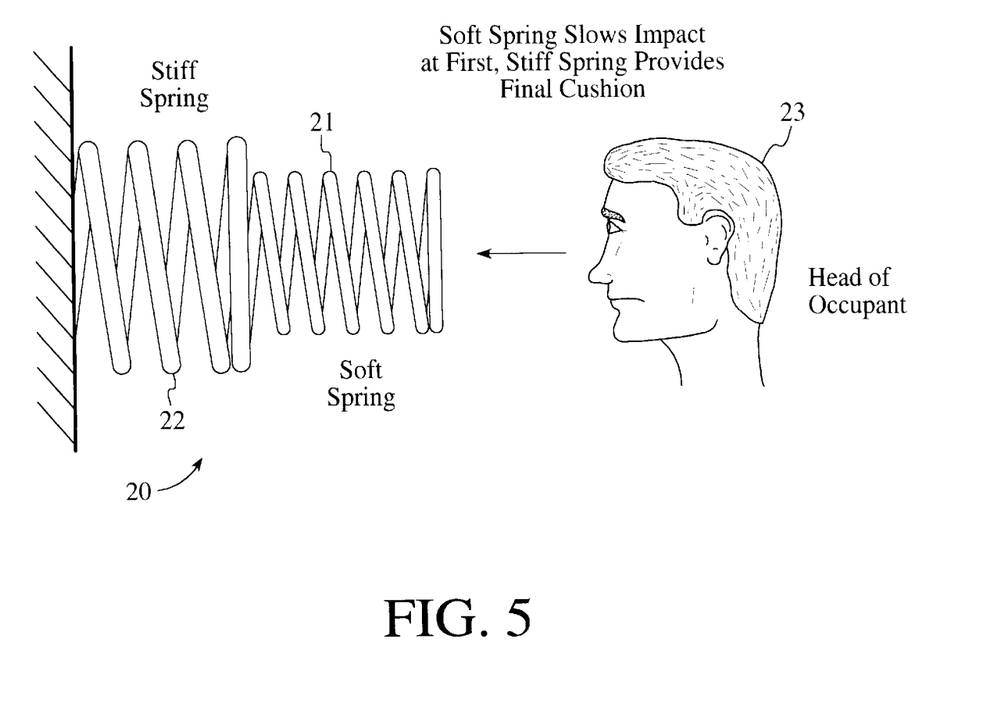
FIG. 5 is a diagrammatic illustration of the effect of a multi-stage inflatable bag arrangement of the invention.

The deflation characteristics for a multi-stage airbag system in accordance with the present invention is illustrated in FIG. 5 of the drawings. This figure depicts a two-stage spring which represents a deflating two-stage airbag with a controllable, non-fixed, deflation rate.

There are two springs in a series 20, with a first spring 21 softer than a second spring 22. When the occupant 23 strikes the first, softer spring 21, his or her overall velocity is gently cushioned by the soft spring. The soft spring, therefore, provides velocity reduction of the occupant during the initial period of deceleration during an accident.

As time progresses, the soft spring compresses and equalizes with the second, stiffer spring 22. The overall velocity of the occupant 23 has already been reduced substantially when the stiff spring 22 is encountered due to the effect of the soft spring 21.

Thus, the maximum force experienced by the occupant due to deceleration during an accident is less than it would be for a single-spring design. A deflating two-stage airbag behaves in a manner similar to the two-stage spring.

With the multi-stage airbag system of the present invention, the occupant is protected during high speed accidents as well as low speed accidents. For high speed accidents, some protection of the occupant is derived from portions of the inflatable bag which inflate and deflate more rapidly than current airbag designs. For low speed accidents, the occupant is protected by portions of the inflatable bag which inflate and deflate more slowly than current airbags.

Figure 2:
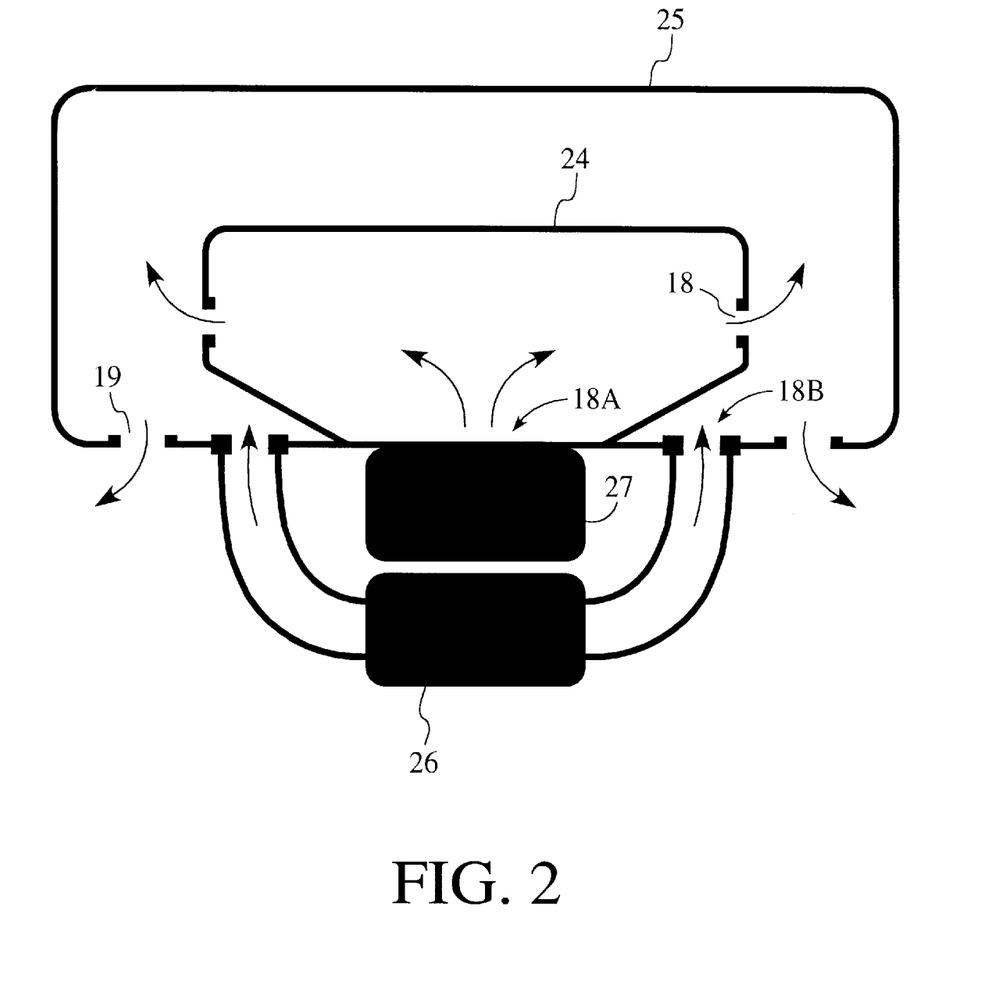
FIG. 2 is an illustration of a modification of a multi-stage inflatable bag arrangement of the present invention.

FIG. 2 of the drawings illustrates a modification of the present invention in which a primary inflatable bag 24 is only partially contained in the secondary inflatable bag 25. A second inflator 26 is added to function with the first inflator 27 to fill the secondary inflatable bag 25 directly by ports 18B.

In this illustration of a modification, the seal S is preaent between the primary inflatable bag 24 and the secondary inflatable bag 25.

Figure 3:
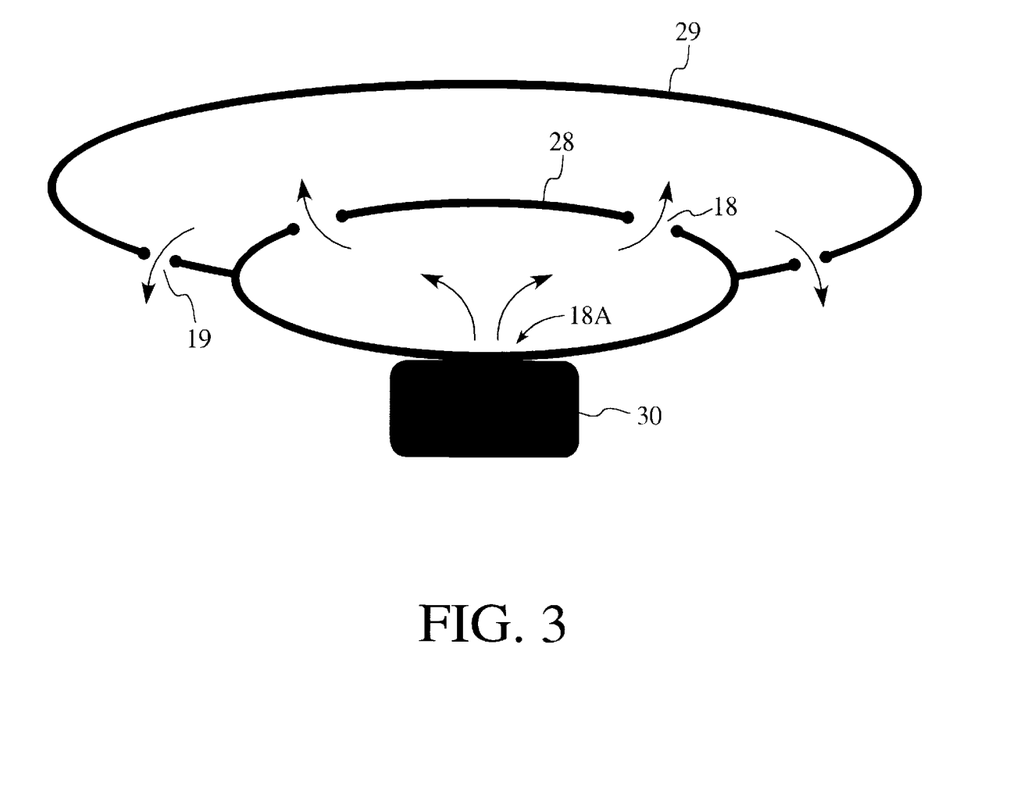
FIG. 3 is an illustration of a further modification of a multi-stage inflatable bag arrangement of the invention.

FIG. 3 of the drawings is an illustration of a modification of the present invention wherein a primary inflatable bag 28 is only partially within a secondary inflatable bag 29. In this modification, a single inflator 30 is used.

The multi-stage airbag system of the present invention has an additional advantage when pyrotechnic inflators are used. Any hot particles produced by the inflator are trapped inside the heavy primary bag and do not cause damage or burns on the secondary bag.

The invention has been shown, described and illustrated in substantial detail with reference to the presently preferred form of the invention. It will be understood by those skilled in this art that various other and further changes and modifications may be made without departing from the spirit and scope of the invention which is defined by the claims appended hereto.

What is claimed is:

1. In an inflatable bag safety system for vehicles to protect occupants from injury during accidents, a multi-stage airbag arranged to provide more control of the inflation performance characteristics to permit reduced risk of harm to an occupant by providing more gentle protection upon contact with the bag, comprising:

a primary inflatable bag, and a secondary inflatable bag, each of a predetermined size and material;

said secondary inflatable bag having an outer surface softer than said material of said primary inflatable bag;

said primary inflatable bag having first port means communicating with inflation means to inflate said primary inflatable bag at a first predetermined and controlled rate with a preselected gas;

said primary inflatable bag being formed of a size to fit within said secondary inflatable bag and sealed together about said first port means;

said primary inflatable bag having second port means to exhaust said preselected gas into said secondary inflatable bag at a second predetermined and controlled rate slower than said first rate, and;

said secondary inflatable bag having exhaust port means for exhausting said preselected gas at a predetermined and controlled rate.

whereby an improved velocity control is obtained for said outer softer surface of said secondary inflatable bag during an inflation period of said inflatable bag, as shown by the lighter line in FIG. 4A of the drawings.

2. In an inflatable bag safety system for vehicles as defined by claim 1 including computer means connected to energize said inflation means.

3. In an inflatable bag safety system for vehicles as defined by claim 2 including sensor means connected with said computer means for initiating an inflation sequence.

4. In an inflatable bag safety system for vehicles as defined by claim 2 wherein said inflation means is a preselected pyrotechnic inflator means.

5. In an inflatable bag safety system for vehicles as defined by claim 4 including sensor means connected with said computer means for initiating an inflation sequence.

6. In an inflatable bag safety system for vehicles as defined by claim 4 including squibb means to control initiation of said inflation means.

7. In an inflatable bag safety system for vehicles as defined by claim 4 wherein said predetermined material of which said primary inflatable bag is formed is of a type that minimizes hazardous effects of hot particles from said preselected pyrotechnic inflator mans.

8. In an inflatable bag safety system for vehicles as defined by claim 1 wherein said predetermined and controlled rate at which said second port means exhausts said preselected gas into said secondary inflatable bag is less than said rate said first port means inflates said primary inflatable bag.

9. In an inflatable bag safety system for vehicles as defined by claim 8 wherein said predetermined and controlled rate at which said second port means exhausts said preselected gas into said secondary inflatable bag is higher initially than said rate said first port means inflates said primary inflatable bag, and the volume within said secondary inflatable bag is greater than the volume within said primary inflatable bag, so that the inflation time of said secondary inflatable bag is longer than the inflation time of said primary inflatable bag.

10. In an inflatable bag safety system for vehicles to protect occupants from injury during accidents, a multi-stage airbag, comprising:

a primary inflatable bag, and a secondary inflatable bag, each of a predetermined size and material;

said predetermined material of which said secondary inflatable bag is formed is lighter and softer than said predetermined material of which said primary inflatable bag is formed;

said primary inflatable baa having first port means communicating with inflation means to inflate said primary inflatable bag at a predetermined and controlled rate with a preselected gas;

said primary inflatable baa being formed of a size to fit within said secondary inflatable bag and sealed together about said first port means;

said primary inflatable baa having second port means to exhaust said preselected gas into said secondary inflatable bag at a predetermined and controlled rate, and;

said secondary inflatable bag having exhaust port means for exhausting said preselected gas at a predetermined and controlled rate.

* * * * *